United States Patent [19]

Fiddler

[11] Patent Number: 4,647,223
[45] Date of Patent: Mar. 3, 1987

[54] COLD STORAGE ROOM THERMOMETER AND BACK-UP POWER SUPPLY

[75] Inventor: R. Charles Fiddler, Parsons, Tenn.

[73] Assignee: Kolpak Industries, Inc., Parsons, Tenn.

[21] Appl. No.: 770,668

[22] Filed: Aug. 29, 1985

[51] Int. Cl.⁴ .............................................. G01K 1/08
[52] U.S. Cl. .................................... 374/141; 374/170; 62/127; 307/66; 340/585
[58] Field of Search ................ 374/141, 170; 340/532, 340/585, 693; 62/127; 307/64, 66; 315/86

[56] References Cited

U.S. PATENT DOCUMENTS

| | | | |
|---|---|---|---|
| 1,604,265 | 10/1926 | Dosbaugh | 200/159 A |
| 1,770,055 | 7/1930 | Williams | 315/86 |
| 2,326,070 | 8/1943 | Schaelchun et al. | 307/64 |
| 2,447,893 | 8/1948 | Bauman | 340/585 |
| 2,534,542 | 12/1950 | Bower | 307/64 |
| 2,729,750 | 1/1956 | Draper et al. | 307/66 |
| 2,740,953 | 4/1956 | Jeppesen | 340/506 |
| 3,322,964 | 5/1967 | Walter et al. | 315/86 |
| 3,340,402 | 9/1967 | Curtis | 307/66 |
| 3,689,888 | 9/1972 | Wootton | 340/539 |
| 3,720,839 | 3/1973 | Spahr | 307/66 |
| 3,753,259 | 8/1973 | Donovan | 340/507 |
| 3,816,752 | 6/1974 | Goodwin | 307/66 |
| 3,959,787 | 5/1976 | Messmann et al. | 340/585 |
| 4,138,670 | 2/1979 | Schneider et al. | 340/693 |
| 4,251,813 | 2/1981 | Carre | 340/693 |
| 4,298,947 | 11/1981 | Tamura et al. | 374/170 |
| 4,319,228 | 3/1982 | Daniels | 340/693 |
| 4,387,368 | 6/1983 | Day, III et al. | 340/539 |
| 4,387,578 | 6/1983 | Paddock | 62/127 |
| 4,482,785 | 11/1984 | Finnegan et al. | 340/539 |

Primary Examiner—Charles Frankfort
Assistant Examiner—Thomas B. Will
Attorney, Agent, or Firm—Irvin A. Lavine

[57] ABSTRACT

An electrically operated thermometer for a cold storage room is normally supplied with current from the secondary winding of a transformer, the primary winding being connected to a conventional alternating current source. A battery is alternatively connected to the thermometer through a manual switch, which is preferably of the momentary type, which must be held engaged.

10 Claims, 4 Drawing Figures

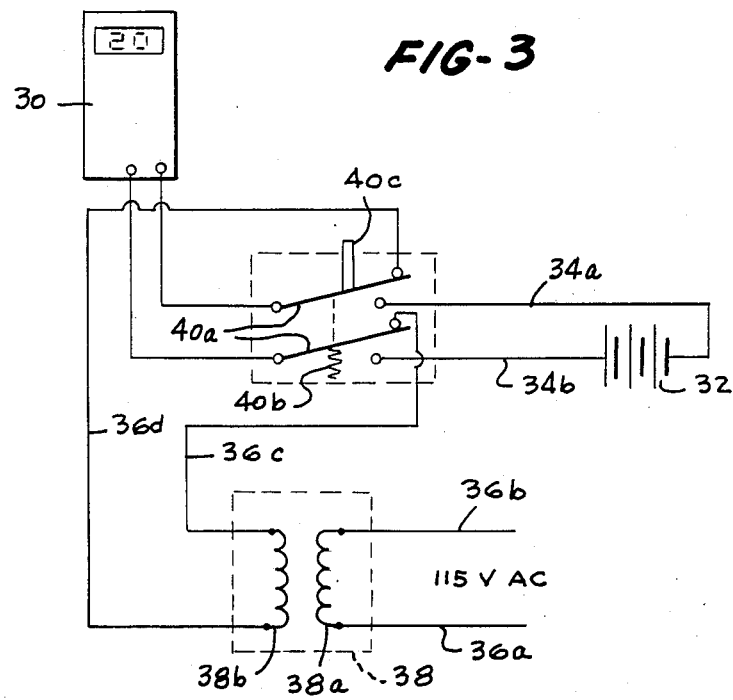
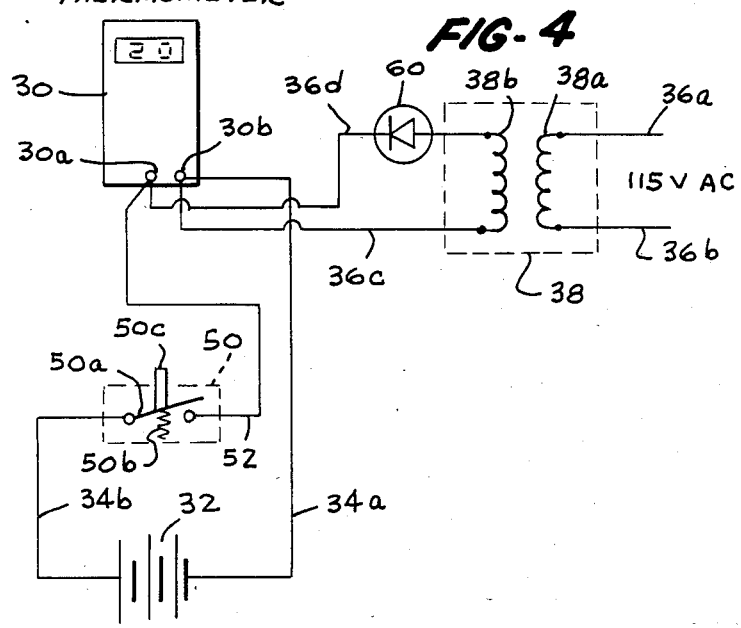

COLD STORAGE ROOM THERMOMETER AND BACK-UP POWER SUPPLY

TECHNICAL FIELD

The present invention relates to power supply circuits for electrically operated thermometers used in cold stroage rooms.

BACKGROUND ART

To store frozen food over a period of many days, particularly in connection with warehousing and large retail store operations, it is common to provide a cold storage room. A cold storage room, which may be of any desired size, is well insulated, has a refrigerating system associated with it, and at least one entrance way with a door. Since it is important that the operator know the temperature which is being maintained in the cold storage room, the cold storage rooms are provided with a thermometer. Typically, the themometers are electrically operated, having a thermoelement and an indicator.

In their perferred forms, the thermoelement comprises a selected theromcouple and the indicator is preferably a common numerical LED digital display indicator with changable numbers. The thermometer is supplied with current, typically utilizing line current at approximately 115-120 volts A.C., connected to the primary winding of a transformer, the secondary winding of which generates a lower voltage, such as nine volts.

It has been recognized that power failure of the current to the main supply lines for the refrigeration system occurs, and equipment has been provided either to give alarms, or to connect alternate power sources. For example, Jeppesen U.S. Pat. No. 2,740,953 provides a system in which line current is supplied to refrigeration apparatus, and is caused to pass through a relay. When the line current stops, as due to power failure, the relay becomes inactive, causing the closing of a switch which thereby completes a circuit which includes a back-up battery and an indicator, so that the indicator, such as a bell and a light are energized to give an alarm that there has been a power failure. Day, III et al., U.S. Pat. No. 4,387,368 discloses a water chilling system in which a back-up battery is maintained charged by a battery charger operated from the main power line. Upon failure of line current, the battery is placed in the circuit, to provide an alternate source of power to operate the water chilling equipment.

Wootton U.S. Pat. No. 3,689,888 provides an alarm system including a battery and a battery charging circuit, the battery being placed in operation when the power supply fails. A sensing circuit is provided for sensing a number of failed situations including power failure, refrigeration loss, etc.

Donovan U.S. Pat. No. 3,753,259 discloses a warning system for use with a refrigerated food case, the system including a battery used to provide back-up power in order to give a signal upon failure of the main power or current input.

Messmann et al., U.S. Pat. No: 3,959,787 provides a system for generating an alarm if there is an improperly high temperature within a refrigerator. The system includes a thermostat within the refrigerator which is connected to an alarm unit on the outside of the refrigerator, the alarm unit including a battery and a lamp, the circuitry providing for the tripping of a solenoid, thereby closing the battery and lamp circuit, upon the occurence of an improperly high temperature within the refrigerator.

In all of the above disclosures, the battery in the back-up power circuit or in the alarm circuit, once energized, remains energized, and is thereby continuously depleted.

DISCLOSURE OF INVENTION

Apparatus for sensing and indicating the temperature, particularly of cold storage room, is provided, and includes a thermometer comprising a thermoelement and temperature indicating means, the thermometer being supplied with low voltage current from the power lines or mains through a transformer. A back-up power supply system for the thermometer is provided, including a battery and a switch. The switch has a first position, to which it is constantly urged as by a spring, in which the thermometer is connected with the low voltage output secondary winding of the transformer, and the battery circuit is open; the switch has a second position in which the circuit between the battery and the thermometer is closed. The switch is manually actuated against the spring force urging it into the first position, so that it is placed in the second position as by manual depression of a button and automatically returns to the first position when manual force is released. The apparatus also contains means for preventing the flow of current from the battery through the secondary winding of the transformer.

The circuitry may include a double pole - double throw switch, connecting the thermometer either to the secondary winding of the transformer or to the battery; alternatively, there may be provided a single pole switch which, when closed, connects the battery to the thermometer, there being in the transformer secondary winding or in the external circuit thereof means permitting flow of current in one direction only, such as a diode which prevents current flow from the battery through the secondary winding when the single pole switch is closed.

Among the advantages of the present invention are the provisions of a temperature sensing apparatus, with both a normal energizing circuit and an emergency energizing circuit providing a back-up power supply, and the invention has the further advantage that the emergency circuit is energized only monentarily, so as to preserve the energy of the back-up battery. A further advantage of the present invention is the provision of a temperature indicating system which includes a back-up circuit including a battery and means for energizing the battery only when it is desired to have an indication of the temperature of the cold storage room, thereby limiting the drain on the battery and preserving its life.

Other objects and many of the attendant advantages of the present invention will be readily understood from the following specification, claims and drawings.

BRIEF DESCRIPTION OF DRAWINGS

FIG. 3 is a diagram illustrating circuitry in accordance with the present invention.

FIG. 4 is a diagram showing an alternate circuit arrangement.

BEST MODES OF CARRYING OUT THE INVENTION

Figure 1:
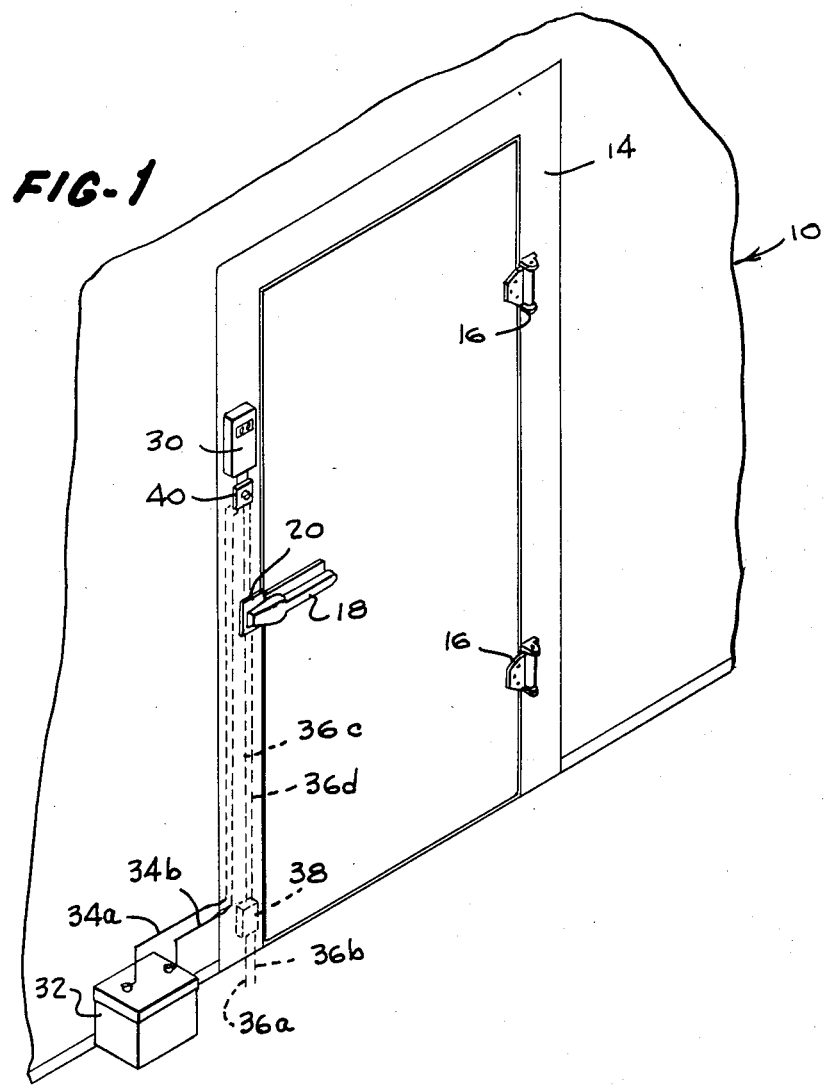
FIG. 1 is a perspective elevational view, partly diagrammatic, of a cold storage room having the thermometer and main and back-up circuits in accordance with the present invention.

Referring now to the drawings, wherein like or corresponding reference numerals are used to designate like or corresponding parts throughout the several views, there is shown in FIG. 1 a part of conventional cold storage room 10, which is typically provided with wall, ceiling and a floor, all of which are insulated, and which has associated with it refrigeration equipment so as to establish and maintain a suitably low temperature therewithin. A door 12 is provided, mounted within a door jamb assembly 14, which is conventionally constructed as a separate and distinct subassembly. The door is supported by hinges 16 on the door jamb assembly 14, and is secured in closed position by a handle 18 engaging a striker plate 20 on door jamb assembly 14.

Also shown in FIG. 1 is an indicator 30 forming a part of a thermometer, a battery 32, and conductors 34a and 34b extending to a momentary switch 40. Also shown are main current supply lines 36a and 36b, transformer 38, and conductors 36c and 36d extending from transformer 38 to the switch 40.

As will be understood, the positioning of the above-described elements is schematic, and therefore the arrangement of the elements may not be as shown in FIG. 1. Further, the battery 32 may be of a different size, and placed in a different position than as illustrated in FIG. 1.

Figure 2:
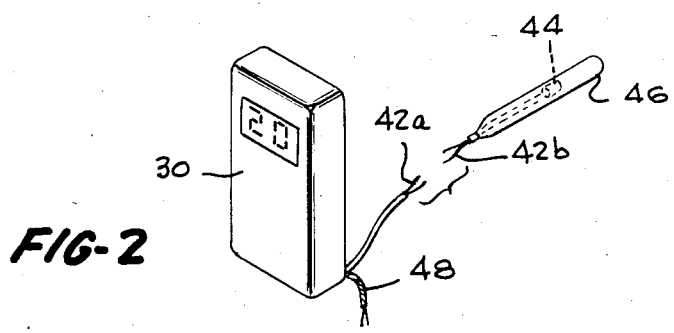
FIG. 2 is a perspective view, partly diagrammatic, and with parts removed, of a thermometer form a part of the present invention.

In FIG. 2, there is shown the indicating portion 30 of a conventional LED digital read-out forming a part of the thermometer, conductors 42a and 42b connected with the indicator 30 and with a thermoelement 44. Thermoelement 44 is of well known construction, and may be, for example, a thermocouple of a desired type. However, a junction type thermoelement, such as an NPN transister, or a diode, are perfered.

The thermoelement 44 is placed in a conventional sheath or housing 46, to protect it. The indicator 30 is provided with a conduit 48 to house the necessary conductors supplying current to it.

Referring now to FIG. 3, there may be seen the conductors 36a and 36b connected to the primary winding 38a of transformer 38, the secondary winding 38b of which is connected by conductors 36c and 36d to the switch 40. The battery 32 is connected by conductors 34a and 34b to contacts in double pole-double throw switch 40. The blade 40a of switch 40 is shown engaging contacts which are connected to the conductors 36c and 36d from secondary winding 38b. Blade 40a is urged by suitable means such as spring 40b into the position shown, which is the first position of switch 40, so that in this position, current will flow from secondary winding 38b through the switch 40 and to the thermometer. In this first position, battery 32 is in an open circuit, and therefore no current flows from the battery 32 when switch 40 is in the first position. A push button 40c is provided, to be engaged by a finger, which thereby enables the blade 40a of switch 40 to be moved to the second position, in which the battery 32 is placed in circuit with the thermometer. In the second position of the switch 40, the secondary winding 38b of transformer 38 is in an open circuit, thereby preventing a flow of current from battery 32 to the secondary winding 38b when the switch is in the second position. Upon removal of the finger from the push button 40c, spring 40b will cause switch blade 40a to return to the first position, thereby opening the circuit which includes battery 32.

In operation, therefore, it will be understood that when current is supplied through conductors 36a and 36b to the primary winding 38a of transformer 38, a low voltage, such as nine volts, will be generated in the secondary winding 38b, and with the switch 40 in the first position illustrated in FIG. 3, low voltage current will be supplied to the thermometer, so that the temperature in the cold storage room 10 will be coninuously indicated by temperature indicator 30. When there is a power failure, so that the current does not flow through the conductors 36a and 36b, no current will be supplied to the thermometer, and the indicator 30 will provide no indication of temperature. An operator of the cold storage room 10, upon noticing the lack of an indication of temperature by temperature indicator 30 will immediately be informed that there has been a power failure. As a result, assuming that the cold storage room 10 has a higher temperature on its exterior than in its interior, it will gradually begin to have the interior temperature increase. In order to determine, from time to time, the temperature of the interior of cold storage room 10, the push button 40c may be depressed, moving the switch blade 40a to the second position, against the force of spring 40b, connecting battery 32 to the thermometer and thereby enabling the indicator 30 to provide a reading of the temperature within cold storage room 10. The switch 40 will remain in the second position for a very short time, causing only a limited amount of energy to flow from the battery 32, and thereby providing for extended availability of battery 32, due to the fact that it is not continuously in a closed circuit.

In FIG. 4, there is shown an alternate construction, there being shown the battery 32, transformer 38, and indicator 30 of the thermometer. A conductor 34b is connected to the positive pole of the battery 32, and to blade 50a of a single pole of single throw momentary switch 50. The blade 50a is urged into the position shown, in which the switch 50 is open, by suitable means such as a spring 50b. A push button 50c is provided, for urging the switch blade 50a into closed position, against the force of spring 50b when depressed by a finger. A conductor 52 connects a fixed contact within the switch 50 to a positive contact 30a of the LED digital temperature indicator 30, to which contact 30a there is also connected the conductor 36d leading from the secondary winding 38b of transformer 38. The negative terminal of battery 32 is connected by a conductor 34a to a contact or terminal 30b of indicator 30, to which is also connected the conductor 36c from secondary winding 38b.

A diode 60 is provided in the circuit of secondary winding 38b, either within the transformer 38, or exteriorly thereof, diode 60 limiting the current flow through secondary winding 38b and conductors 36c and 36d to a single direction, as is conventional.

In operation, power is supplied through power supply lines 36a and 36b to the primary winding 38a of transformer 38, causing a lower voltage current to flow through the circuit including secondary winding 38b, diode 60, conductors 36c and 36d and the thermometer, thereby energizing the indicator 30 and causing it to provide a reading of the temperature within the cold storage room 10. The single pole single throw switch will be in the first position thereof, as illustrated in FIG. 4, in which no current flows through it, the switch blade 50a being urged to the open position by spring 50b. Upon the occurence of a power failure, the thermometer will not be supplied with energy from the transformer 38. Movement of the push button 50c against the urging of spring 50b will cause the switch blade 50a to complete a circuit through single pole single throw switch 50 from battery 32 through conductors 34b and 52, the thermometer and the conductor 34a. Current will be prevented from flowing through the secondary winding 38b by the diode 60. Current will flow from the battery 32 only so long as the push button 50c is held depressed, so that once the operator has noted the indication given by temperature indicator 30 of the thermometer, push button 30c is released, thereby opening the circuit including the battery 32. Thus, there is only a minimal and monentary drain of the energy from battery 32.

There has been provided a back-up system for a thermometer for a cold storage room, including a battery and a switch having a normal position in which the battery circuit is open, and a second or emergency position, to which the switch may be moved by manual operation, the battery being connected in the second position to the thermometer so as to provide energy to it to permit it to provide an indication of the temperature within the cold storage room. In the second or emergency position, there is prevented a flow of energy from the battery into the secondary winding of the normally operated transformer, thereby preventing drain of energy from the battery. In addition, the circuitry is such that the switch is maintained in the second or emergency position for only a limited period of time, as by a spring urging a manual switch into a first, normal position, thereby limiting the drain on the back-up battery.

The claims and the specification describe the invention herein presented and the terms that are employed in the claims draw their meaning from the use of such terms in the specification. Some terms employed in the prior art may be broader in meaning than specifically employed herein. Whenever there is a question between the broader definition of such terms as used in the prior art and the more specific use of the term herein, the more specific meaning is meant.

It will be obvious to those skilled in the art that various changes may be made in the herein disclosed apparatus. However, the invention is not limited to what is set forth in the specification or described in the drawing, but only as defined in the claims appended hereto.

I claim:

1. In a temperature sensing and indicating apparatus for a cold storage room or the like,
   (a) a thermometer including a thermoelement and temperature indicating means,
   (b) means for supplying said thermometer with low voltage electric energy including means for transforming a higher input voltage to a lower output voltage,
   (c) second means for supplying said thermometer with low voltage electric energy, and
   (d) manually operated switch means having a first position in which said thermometer is connected to said first mentioned energy supplying means, and a second position in which said thermometer is connected to said second energy supplying means, said switch means comprising means for moving said switch means from the second position thereof when not manually urged into said second position, whereby upon failure of said first supply means, said thermometer may be energized by manual operation of said switch means and automatically disconnected from the second energy supply means when the switch means is not manually urged into said second position.

2. The apparatus of claim 1, said manually operated switch means comprising a double-pole, double throw switch.

3. The apparatus of claim 2, said manually operated switch means comprising means for urging said switch into said first position.

4. The apparatus of claim 2, said manually operated switch means comprising a spring for urging said switch into said first position.

5. The apparatus of claim 1, said manually operated switch means comprising means for urging said switch means into said first position.

6. The apparatus of claim 1, said manually operated switch means comprising a spring for urging said switch means into said first position.

7. The apparatus of claim 1 wherein said switch means includes means for preventing current flow from said second energy supplying means to said transforming means when said switch means is in said second position.

8. A cold storage room temperature indicating system comprising:
   (a) a thermometer including a thermoelement and a temperature indicator,
   (b) a transformer power supply,
   (c) a battery, and
   (d) means for selectively supplying electrical energy to said thermometer including a manually operated switch connected to said transformer power supply and to said battery, the switch having means for urging it into a first position in which it connects said thermometer and said transformer power supply, said switch having manual operating means for moving said switch to a second position against the force of said urging means in which second position said thermometer is connected to said battery.

9. The cold storage room temperature indicating system of claim 8, said switch comprising means for disconnecting said thermometer from said transformer power supply in the second position thereof.

10. The cold storage room temperature sensing system of claim 9, said switch being a double pole double throw switch.

* * * * *